United States Patent [19]

McCarty et al.

[11] Patent Number: 4,527,110
[45] Date of Patent: Jul. 2, 1985

[54] CHARGER FOR BATTERIES

[75] Inventors: George W. McCarty, Lutherville; Somers H. Smith, III, Columbia, both of Md.

[73] Assignee: Solid State Chargers Research & Development, Lutherville, Md.

[21] Appl. No.: 598,580

[22] Filed: Apr. 10, 1984

[51] Int. Cl.³ .................. H01M 2/10; H01M 10/46
[52] U.S. Cl. .................................. 320/2; 429/99; 429/100
[58] Field of Search .................................. 320/2–4; 429/99, 100

[56] References Cited

U.S. PATENT DOCUMENTS

| 2,642,520 | 6/1953 | Coolidge et al. | 320/2 X |
| 3,473,859 | 10/1969 | Kircher | 320/2 X |
| 3,519,914 | 7/1970 | Fujimaki et al. | 320/2 |
| 4,086,523 | 4/1978 | Izumi | 320/2 |
| 4,389,469 | 6/1983 | Nicholls | 429/99 X |
| 4,409,536 | 10/1983 | Evjen | 320/2 |

Primary Examiner—R. J. Hickey

Attorney, Agent, or Firm—Leonard Bloom

[57] ABSTRACT

A charger for batteries includes a housing having an open portion through which batteries to be charged are to be inserted. A constant tension spring within the housing urges the batteries outwardly of the housing. A cover is provided adjacent to the open portion of the housing, the cover being movably, pivotably supported on the housing. A pair of spaced-apart contact prongs are provided, at least one of which is carried by the movable cover, thereby preventing electrical connection to the prongs wherever the cover is moved away from the open portion of the housing. A latch arrangement retains the cover in a closed orientation. The batteries in the housing are retained therein by a portion of the latch whenever the cover is pivoted away from the open portion of the housing. One of the contact prongs is carried by the cover and moves therewith. A solid-state charging circuit within the housing is connected to the other one of the contact prongs. The charging circuit is an integrated circuit disposed against an extension of the other one of the contact prongs, thereby utilizing the other contact prong as a heat sink.

40 Claims, 12 Drawing Figures

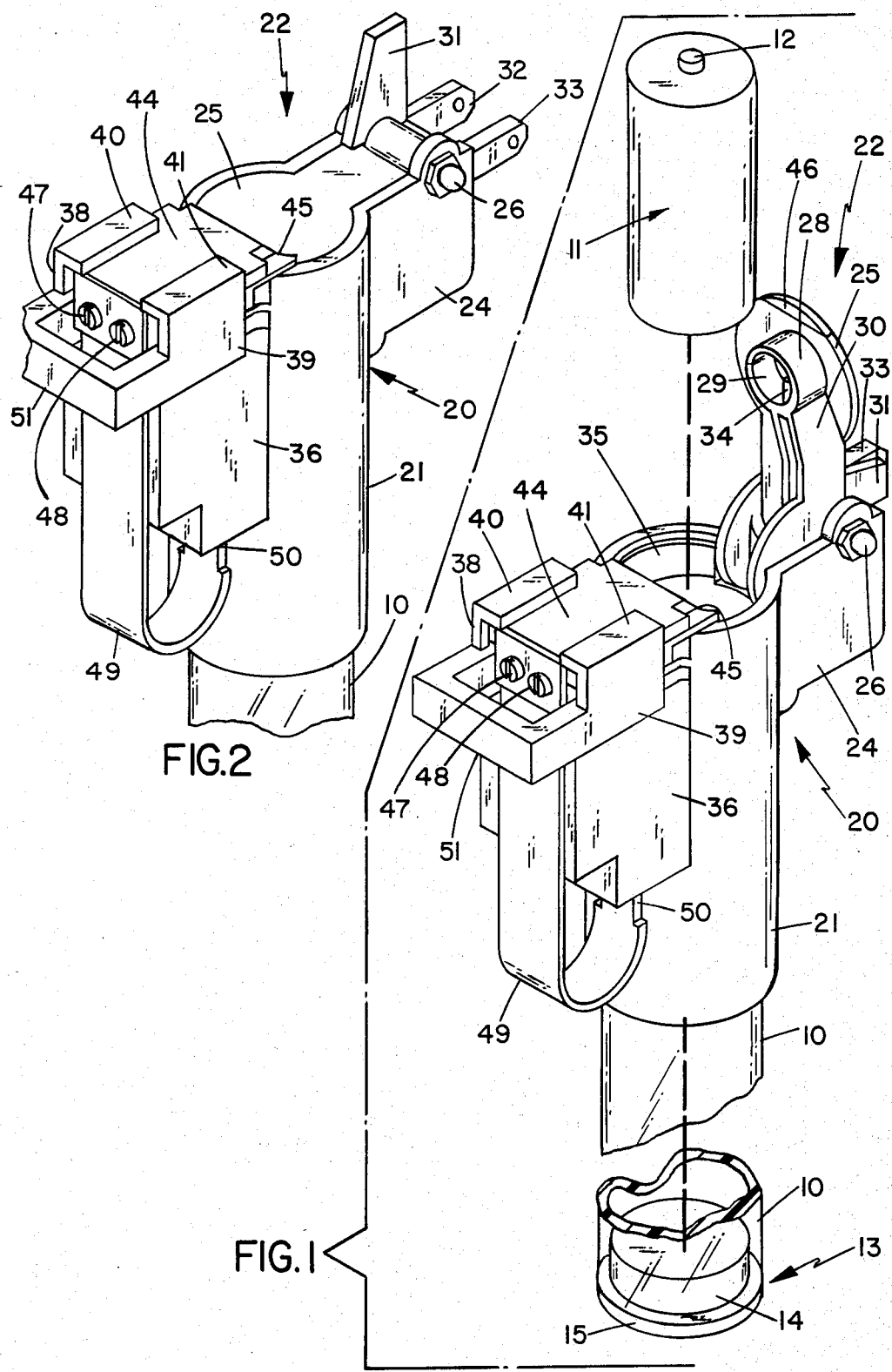

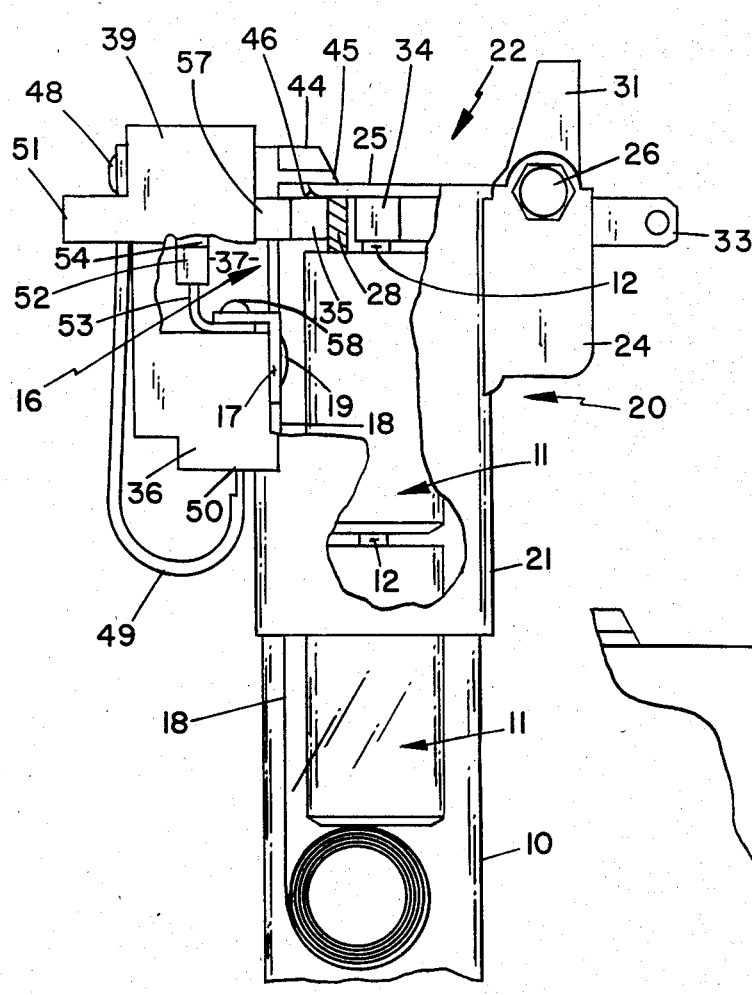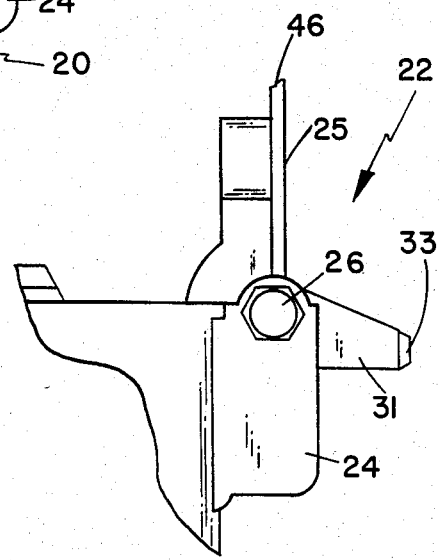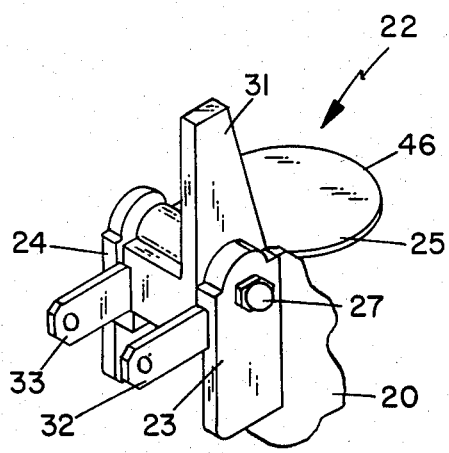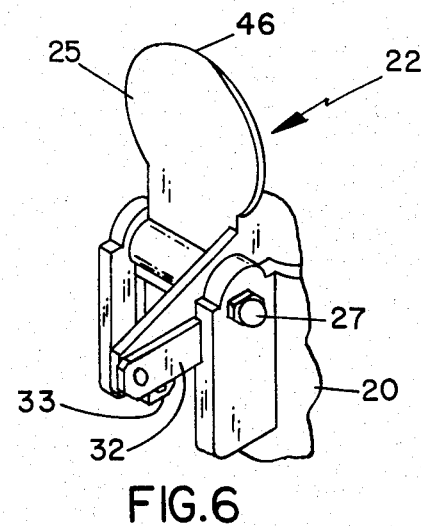
FIG.3
FIG.4
FIG.5
FIG.6

CHARGER FOR BATTERIES

BACKGROUND OF THE INVENTION

This invention relates to a charger for batteries which includes a housing having a pair of contact prongs extending therefrom, the prongs being adapted to be inserted into a conventional A.C. wall outlet or the like. The present invention relates, more particularly, to such a charger for batteries in which the batteries to be charged or recharged are supported by the housing.

It is known from U.S. Pat. No. 4,009,429 issued Feb. 22, 1977 to Ferdinand H. Mullersman and entitled, "Charger With Multiple Attachable Cellholder Modules" to provide a battery charging arrangement which includes a housing having a pair of prongs extending therefrom adapted to be inserted into a conventional A.C. wall outlet. This system includes a charge current source constituted by a transformer arrangement within the housing. A plurality of electrical contacts extend from the housing and are adapted to cooperate with corresponding contacts which extend from a removable cellholder module which includes one or more rectifiers to provide a D.C. output to one or more single cell batteries which are supported by the module. The module, in turn, is supported by the housing which has the pair of prongs extending therefrom, both module and housing being supportable by the A.C. receptacle. Individual cellholder modules are provided for supporting different sized cells, for example, AA, C or D cells, depending on which size of cell a user wishes to have charged or recharged. Similar chargers for batteries are disclosed in respective U.S. Pat. Nos. 4,173,733, 4,319,178 and 4,409,536 issued respectively on Nov. 6, 1979, Mar. 9, 1982 and Oct. 11, 1983 to Raymond K. Sugalski et al., Raymond K. Sugalski and John M. Evjen.

It is known from U.S. Pat. No. 4,064,447 issued Dec. 20, 1977 to James E. Edgall et al., and entitled "Cordless Portable Electrically Powered Device" to provide in a cordless electrically powered device a removable a power pack which includes a housing within which batteries and a rectifying arrangement are positioned and from which a pair of contact prongs extend, when the housing is removed from the tool. The contact prongs are adapted to be inserted directly into a A.C. outlet receptacle so as to support the housing within which the battery pack is housed along with the rectifying arrangement so that the batteries in the housing may be recharged. Similar cordless electrical devices having removable power packs are disclosed in respective U.S. Pat. Nos. 4,084,123 and 4,191,917 granted respectively Apr. 11, 1978 and Mar. 4, 1980 to Lynn D. Lineback and Wayne R. Brown.

Of general interest as showing the background prior art are a number of additional U.S. Patents identified as follows:

| U.S. Pat. Nos. | Inventor(s) | Issue Date |
|---|---|---|
| 3,209,230 | Joseph A. Mas | September 28, 1965 |
| 3,261,973 | Herbert Kott | July 19, 1966 |
| 3,320,508 | Franklin C. Bradshaw et al. | May 16, 1967 |
| 3,360,708 | David Palmer-Person | December 26, 1967 |
| 3,391,321 | Hajime Ota | July 2, 1968 |
| 3,435,318 | Joseph A. Mas | March 25, 1969 |
| 3,579,075 | Linton E. Floyd | May 18, 1971 |
| 3,629,680 | William R. Baynes | December 21, 1971 |

-continued

| U.S. Pat. Nos. | Inventor(s) | Issue Date |
|---|---|---|
| | et al. | |
| 3,696,283 | John W. Ackley III | October 3, 1972 |
| 4,101,818 | William T. Kelly III et al. | July 18, 1978 |
| 4,205,121 | Yasuo Naitoh | May 27, 1980 |
| 4,206,274 | Henricus G. Peels | June 3, 1980 |
| 4,303,876 | William T. Kelly III | December 1, 1981 and |
| 4,403,182 | Warner S. Yeh | September 6, 1983. |

SUMMARY OF THE INVENTION

An object of the present invention is to provide a charger for batteries which includes spaced-apart contact prongs which cannot be inserted into a A.C. receptacle when the charger is open to receive a battery or batteries to be charged or recharged.

Another object of the present invention is to provide a charger for batteries which include contact means which cannot be brought into contact with a source of A.C. power when the charger is open to receive a battery or batteries to be charged or recharged.

An additional object of the present invention is to provide a charger for batteries which includes a constant-tension conductive spring means within its housing which effects the holding of one or more batteries to be charged or recharged in position and, at the same time, provides an electrical contact to the battery or batteries.

A further object of the present invention is to provide a charger for batteries with a latching arrangement which retains a cover for an open portion of the housing in its closed position.

Yet another object of the present invention is to provide a charger for batteries which includes means on a latching means which effect the retention of batteries within the housing whenever the cover is its open position.

Yet an additional object of the present invention is to provide a charger for batteries which includes a solid-state charging means within the housing of the charger, the solid-state charging means being connected to one of a pair of contact prongs.

Yet a further object of the present invention is to provide a battery charger which includes a solid-state charging circuit thermally coupled to one of the prongs of a pair of contact prongs adapted to be inserted into a A.C. outlet.

The invention can be seen as being a combination in a charger for batteries. The combination includes a housing having an open portion through which batteries to be charged are to be inserted. Spring means are provided within the housing for urging the batteries outwardly of the housing. A cover is adjacent to the open portion of the housing. Means for movably supporting the cover on the housing and a pair of spaced-apart contact prongs are included, at least one of the prongs is carried by the movable cover, thereby preventing electrical connection to the prongs wherever the cover is moved away from the open portion of the housing. Latching means is provided for retaining the cover in its closed orientation.

From another aspect, the invention can be viewed as being a combination in a charger for batteries. The combination includes a housing having an open portion through which batteries to be charged are to be inserted, spring means within the housing for urging the batteries outwardly of the housing and a cover for the open portion of the housing. Means are provided for pivotably supporting the cover on the housing. Respective electrical contact means are provided on the housing, at least one of the contact means being carried by the pivotable cover, thereby preventing electrical connection to the contact means whenever the cover is pivoted away from the open portion of the housing. Spring-loaded latching means are included for retaining the cover in its closed orientation. Means on the latching means retain the batteries in the housing whenever the cover is pivoted away from the open portion of the housing.

In another aspect, the invention can be considered to be a combination in a charger for batteries. The combination includes a housing having an open portion through which batteries to be charged are to be inserted, constant-tension conductive spring means within the housing for engaging an end terminal of an innermost battery and cover means for the open portion of the housing. Means are included for movably supporting the cover means on the housing. A pair of spaced-apart contact prongs are provided on the housing, at least one of which is carried by the movable cover, thereby preventing electrical connection to the prongs whenever the cover is moved away from the open portion of the housing. Solid-state charging means are positioned within the housing and connected to the other contact prong.

From yet another viewpoint, the invention can be seen as being a combination in a charger for batteries. The combination includes a housing having an open portion through which the batteries to be charged are to be inserted, cover means for the open portion of the housing, and means for movably supporting the cover means on the housing. A pair of spaced-apart contact prongs are provided on the housing, at least one of which is carried by the movable cover, thereby preventing electrical connection to the prongs whenever the cover is moved away from the open portion of the housing. Solid-state charging means are provided within the housing and connected to the other contact prong, the charging means including an integrated circuit and being disposed against the other contact prong, or an extension thereof, thereby utilizing the other contact prong as a heat sink.

The invention can be seen as a charger for batteries which includes a housing having an open portion through which batteries to be charged are to be inserted. Spring means are provided within the housing for urging the batteries outwardly of said housing. A cover is positioned adjacent to the open portion of the housing, means being provided for movably supporting the cover on the housing. A pair of spaced-apart contact prongs are included, at least one of which is carried by the movable cover, thereby preventing electrical connection to the prongs whenever the cover is moved away from the open portion of the housing. Latching means retain the cover in its closed position.

The invention can be viewed as a charger for batteries which includes a housing having an open portion through which batteries to be charged are to be inserted. Spring means are provided within the housing for urging the batteries outwardly of the housing. A cover is positioned adjacent to the open portion of the housing, means being provided for pivotably supporting the cover on the housing. Respective electrical contact means are provided on the housing, at least one of the contact means being carried by the pivotable cover, thereby preventing electrical connection to the contact means whenever the cover is pivoted away from the open portion of the housing.

The invention can also be viewed as a charger for batteries which includes a housing having an open portion through which batteries to be charged are to be inserted. Constant-tension conductive spring means are provided within the housing for engaging an end terminal (which may be the battery casing) of an innermost battery. Movable cover means is positioned adjacent to the open portion of the housing, means being provided for movably supporting the cover means on the housing. A pair of spaced-apart contact prongs are provided on the housing, at least one of which is carried by the cover means, thereby providing electrical connection to the prongs whenever the cover means is moved away from the open portion of the housing.

In a further aspect, the invention can be viewed as a charger for batteries which includes a housing having an open portion through which batteries to be charged are to be inserted. Cover means is positioned adjacent to the open portion of the housing, means being provided for movably supporting the cover means on the housing. A pair of spaced-apart contact prongs are provided on the housing, at least one of which is carried by the movable cover, thereby preventing electrical connection to the prongs whenever the cover means is moved away from the open portion of the housing.

From another aspect, the invention can be seen as a charger for batteries which includes a housing having an open portion through which batteries to be charged are to be inserted. Biasing means are provided within the housing for urging the batteries outwardly of the housing. A cover is positioned adjacent to the open portion of the housing, means being provided for movably supporting the cover on the housing. A pair of spaced-apart contact prongs are provided, at least one of which is carried by the cover, thereby preventing electrical connection to the prongs whenever cover is moved away from the open portion of the housing. Latching means retain the cover in a closed orientation. Means on the latching means retain the batteries within the housing whenever the cover is in an open orientation with respect to the open portion of the housing. Charging means is provided within the housing and is electrically, and preferably thermally connected to one of the prongs.

The invention can be seen as a charger for batteries which incudes a housing having an open portion through which batteries to be charged are to be inserted and cover means positioned adjacent to the open portion of the housing, means movably support the cover means for movement between a first orientation in which the cover means closes the open portion of the housing and an orientation in which the cover means is positioned away from the open portion of the housing to allow batteries to be inserted and removed. Means for connecting the charger to an A.C. power source are provided. Means responsed to positioning of the cover means for preventing the means for connecting the charger to an A.C. source from functioning unless the cover means is in the first orientation.

BRIEF DESCRIPTION OF THE DRAWINGS

FIG. 1 is a pictorial view of a charger for batteries constructed in accordance with exemplary embodiment of the present invention, a cover for an open portion of the housing of the charger being shown in an open position.

FIG. 2 is a pictorial view of a portion of the charger for batteries illustrated in FIG. 1, the cover for the open portion of the housing being shown in a closed position.

FIG. 3 is a side view of the charger for batteries illustrated in FIGS. 1 and 2 partially broken away, two batteries and a constant-tension spring being visible within the broken-away portion of the charger.

FIG. 4 is a side view of a portion of the charger for batteries shown in FIGS. 1-3, the cover for the open portion being shown in its open orientation.

FIGS. 5 and 6 are respective pictorial views of a portion of the battery charger illustrated in FIGS. 1-3, the cover for the open portion of the housing being illustrated respectively in its closed and open orientation.

DETAILED DESCRIPTION OF THE PREFERRED EMBODIMENTS

Figure 7:
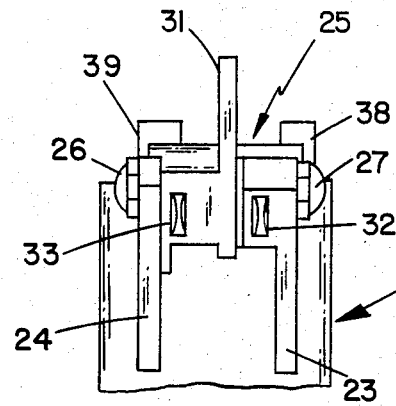
FIGS. 7 and 8 are respective side views of a portion of the charger for batteries illustrated in FIGS. 1-3, the cover for the opening in the housing being illustrated respectively in a closed and open orientation.
Figure 8:
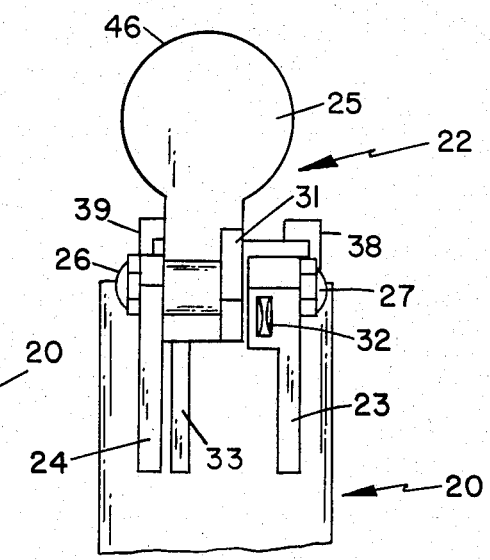

Referring to FIGS. 1-8, the exemplary embodiment of a charger for batteries constructed in accordance with the present invention includes a tubular, cylindrical member 10 preferably made of a transparent plastics material, such as material sold under the trade name of Plexiglas or the like, and dimensioned so as to receive and stack, in an end-to-end, serial electrical connection rechargeable batteries, such as nickel-cadmium batteries of various sizes as AA, C, and D, one such battery 11 being visible in FIG. 1, and two batteries 11 being shown within the cylindrical member 10 in FIG. 3. The cylindrical member 10 is sufficiently long to position therein up to five C cells or up to four D cells, for example, and yet not to be too heavy or have an unacceptable moment or an unacceptable center of gravity to meet requirements of Underwriters Laboratories, Inc. regarding weight and movement limitations, such as devices which can be safely supported by conventional A.C. wall outlet receptacles and the like. Each of the batteries 11 has a center post 12, which serves as the positive terminal of the respective batteries. The outside casing of the batteries 11 serve as their negative terminals.

The lower end of the transparent cylindrical member 10 is closed by a plug 13, made of a suitable plastics material, such as the material sold under the trade name Cycolac or the like, which has a first end portion 14 having a diameter corresponding to the inside diameter of the cylindrical member 10 and which is inserted into the cylindrical member 10. The plug 13 has an a second portion 15 having a diameter corresponding to the outside diameter of the tubular member 10, thereby providing an annular land against which an end of the cylindrical member 10 is positioned. The plug 13 is inserted into the tubular cylindrical member 10 during manufacture and is fixed thereto by a suitable conventional technique, such as application of an epoxy resin or the like.

The opposite end of the tubular member 10 is provided with a slot 16 (FIG. 3) which extends from its upper edge downwardly. An electrically conductive, bent metal strip 17 (FIG. 3) is provided in the bottom of the slot 16, one end portion of this conductive strip extending outwardly from the cylindrical member 10, the other end portion of the strip extending along the inner surface of the cylindrical member 16 approximately one inch. A constant-tension spring 18 is provided within the cylindrical member 10, one end of the constant-tension spring being fixed to the conductive strip 17 by a rivet 19. The rivet 19 serves to fix the constant-tension spring 18 in place, as well as provide an electrical connection from the conductive strip 17 to the spring. As best seen in FIG. 3 the constant-tension spring 18 is so positioned within the cylindrical member 10 so that cylindrical rechargeable nickel cadmium batteries, such as batteries 11, can be inserted one after another into the cylindrical member 10, the constant-tension spring 18 providing support for the batteries and positioning them within the cylindrical member 10 with their respective center, positive posts 12 facing upwardly, the constant-tension spring coming in contact with the outer casing of the lowermost one of the batteries 11, as shown in FIG. 3, to provide an electrical connection thereto, as well as mechanically to bias the batteries 11 toward the open, upper end of the cylindrical member 10 to aid in ejecting them and to position the post 12 of the uppermost one of the batteries 11 so that it may complete the charging circuit. A shaped member generally designated by the numeral 20, made of an electrical insulating plastics material or the like, such as the material sold under the trade name Cycolac, and having a substantially hollow, cylindrical portion 21 is positioned so that its cylindrical portion extends over and about the upper end portion of the cylindrical member 10 and beyond the upper edge thereof for a short distance, the upper edge surface of the cylindrical member 10 forming a land for receiving a cover 22 having a thickness corresponding to the depth of an annular extending recess defined by the land and the upwardly extending inner surface of the cylindrical portion 21.

The shaped member 20 includes a pair of spaced-apart outwardly extending supports 23 and 24 which are integral with the cylindrical portion 21. Near the upward portion of the supports 23 and 24 aligned apertures (not visible) are provided through the supports. The cover 22 includes a substantially flat circular portion 25 which has a thickness corresponding to the afore-mentioned annular extending recess so that the cover 22 can be readily seated on the land within the recess provided at the intersection of the inner surface of cylindrical portion 21 and defined by the upward edge of the cylindrical member 10. The cover 22 is pivotably mounted on a bolt 26 which extends through the aligned apertures in the supports 23 and 24, as well as through an axial bore extending through a peripheral portion of the cover 22 which is integral with the circular portion of the cover 22 which is seated within the annular extending recess. The end of the bolt 26 which extends outwardly from the aperture in the support 24 is conventionally secured by a nut 27 (FIGS. 7, 8) or the like.

Also integrally formed as part of the cover 22 is a centrally positioned, downwardly extending spacer 28 (FIGS. 1, 3) which also strengthens the cover 22 and includes centrally therein a bore 29. The downwardly extending spacer 28 of the cover 22 has a radially extending portion 30 through which a bore (not visible) extends and through which the bolt 26 passes. The bolt 26 provides a bearing surface for the pivotable movement of the cover 22 bringing the underside, peripheral portion of the cover 22 into and out of contact with the seat defined by the upper end edge of the cylindrical member 10 at its intersection with the inner surface of the cylindrical portion 21 of the shaped member 20. The cover 22 is pivotably rotatable by a user exerting thumb or finger force on an upwardly extending protrusion 31 which has an axis of rotation coincident with the axis of rotation of the bolt 26.

Figure 9:
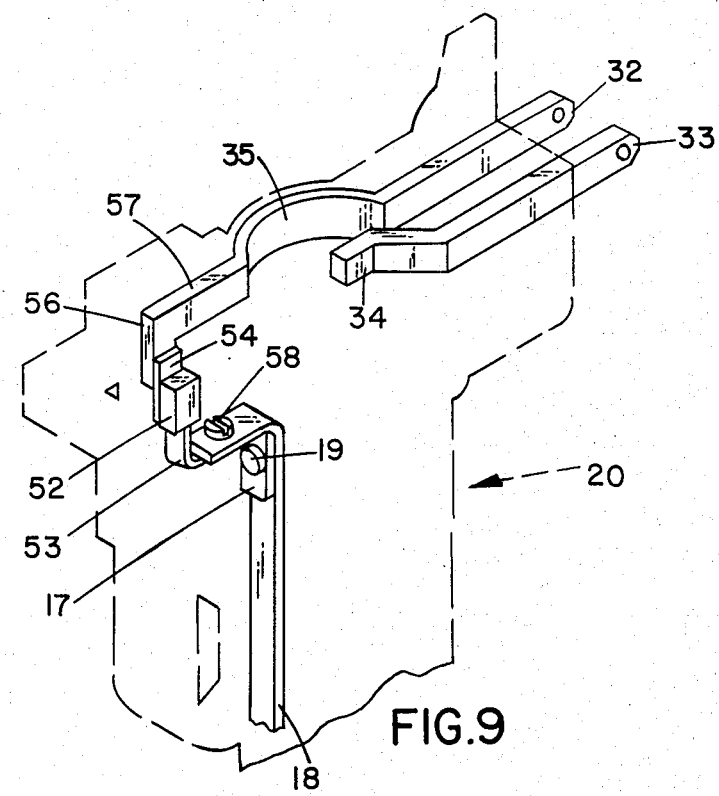
FIG. 9 is an electrical wiring diagram which illustrates the positioning within the charger of the solid-state, current pulse producing, rectifying circuit used in the charger and its electrical and thermal relationship to one of the prongs being illustrated, non-circuit portions being shown in phantom for the sake of clarity.

As illustrated, the battery charger includes a pair of contact prongs 32 and 33, the contact prong 32 extending through the support 23 and outward from a vertical surface thereof. The contact prong 32 is fixed with respect to the shaped member 20. The cooperating contact prong 33, which is spaced from the contact prong 32, extends through and outward from the radially extending portion 30 of the cover 22 and is fixed therein. The contact prong 33 is fixed within the cover 22, it having been molded or otherwise conventionally fixed therein. An end portion 34 of the contact prong 33 terminates within the bore 29 formed in the downwardly extending spacer 28 of the cover 22. The contact prong 33, as is readily apparent, pivots in conjunction with the cover 22 upon application of force by a user to the extending protrusion 31, which brings its end portion 34 into electrical contact with the post 12 of the uppermost battery 11 positioned within the cylindrical member 10 when the cover 22 is in its closed orientation over the upper end of the cylindrical member. The prong 32, which unlike the prong 33, does not rotate in conjunction with the pivoting movement of the cover 22 extends through the support 23 and includes, as best seen in FIG. 9, an arcuately bent portion 35 which is positioned within a groove near the upper end of the cylindrical portion 21 of the shaped member 20.

Also integrally formed with the cylindrical portion 21 of the shaped member 20 is a radially extending support 36 which has a substantially rectilinear recess 37 (FIG. 3) formed therein and includes a pair of upstanding vertical guides 38 and 39 formed thereon, the respective guides including respectfully inwardly extending end portions 40 and 41 which, with a flat horizontal surface of the support 36 extending between the guides define respective parallel grooves in which a flat, slideable substantially rectangular member 44, preferably made of the same material as the shaped member 20 is positioned. A radially inwardly facing surface of the slidable member 44 is constituted by a substantially circularly arcuate beveled surface 45 which slopes upwardly from the end surface of the cylindrical portion 21 of the shaped member 20. The arcuate surface 45 corresponds to the circular arc of that portion 46 of the edge surface of the circular cover 22 which is most distant from its pivotable axis defined by the bolt 26. The portion 46 of the edge surface of the cover 22 is also beveled and oriented so that, when it is brought into engagement with the surface 45 of the slidable member 44 and force exerted, it acts as a cam surface, the slideable member moving radially with respect to the cylindrical member 10. Opposite from the arcuate beveled surface 45, the slideable member 44 is provided with a vertical surface which includes two threaded bores (not visible) adapted to receive respectively screws 47 and 48 which fix one end of a resilient spring member 49 to the member 44. The other end of the spring member 49, which may be made of spring steel or of a resilient plastics material or the like, is fixably connected to the shaped member 20 in a groove 50 which is provided in a downwardly orientated surface of the radially extending support 36 of the shaped member 20 in the vicinity of the cylindrical portion 21 thereof. Extending outwardly from the radially extending support 36 in the vicinity of the screws 47 and 48 and straddling the spring member 49 is a U-shaped, integrally formed extension 51 which serves to protect the spring member 49 from external forces other than those imposed upon it by force exerted against the slidable member 44 either by a user directly exerting a force on the arcuate surface 45 in order to place the batteries 11 within the cylindrical member 10 or by the application of such force by pivotably moving the cover 22 to cover its corresponding arcuate cam surface 46 into contact with the arcuate surface 45 in the course of closing the cover 22 and bring the end portion 34 of the contact prong 33 into direct contact with the post 12 of the uppermost one of batteries 11 within the cylindrical member 10.

As best seen in FIG. 3, an encapsulated solid-state circuit 52, preferably an integrated circuit which produces high current pulses in response to the application of an A.C. input to the contact prongs 32 and 33, is fixably positioned within the substantially rectilinear recess 37. An output terminal connection constituted by the first conductive tab 53 is conventionally conductively connected by a screw 58 or the like to one end of the metal strip 17, thus providing an output connection from the circuit 52 to the electrically conductive constant-tension spring 18 so as to supply current pulses to batteries, such as batteries 11, which are positioned within the cylindrical member 10. As shown in FIG. 3, the solid-state circuit 57 includes an input tab 54 which, as illustrated, is constituted by an extension of a heat sink of the solid-state circuit 52 which is encapsulated in a suitable plastics material, as is conventional. As best seen in FIG. 9, the input tab 54 is fixably connected by a conventional solder connection to a downwardly extending portion 56 of the contact prong 32 which is connected to the arcuate portion 35 of the prong 32 via a straight portion 57. Thus, the solid-state circuit 52 which supplies D.C. current pulses to the battery or batteries 11 sought to be recharged is both thermally and electrically connected to the contact prong 32.

It is to be appreciated that in some instances the thermal and electrical paths to the contact prong 32 from the solid-state circuit 52 should be separated, in instances where the input electrical connection to the solid-state circuit must be made at a portion other than where a heat sink may be provided. Any number of mounting arrangements for the solid-state circuit 52 are possible to effect appropriate suitable separate electrical and thermal connections. A number of possibilities are set out in the copending U.S. patent application Ser. No. 581,773 of George W. McCarty et al., filed Feb. 21, 1984 and entitled, "Solid-State Circuit Integrated With Prong of Molded Plug," the disclosure of which is incorporated herein in its entirety by reference.

Referring briefly to FIG. 9, the electrical circuit and its connections to the battery or batteries 11 sought to be recharged, as well as the positioning of these electrical components with respect to a non-conducting portions of the charger, which are shown in phantom, is illustrated. The prong 32 is connected, as pointed out above, to the solid-state circuit 52, via a series circuit constituted by the arcuate portion 35, straight portion 57 and vertical portion 56 thereof, and the input tab 54 (an extension of the heat sink). The output D.C. current pulses from the solid state circuit 52 are fed to the batteries 11 within the cylindrical member 10 via the series connection of the bent output tab 53, the bent metal strip 17 and the constant tension spring 18. The circuit is completed to the other one of the contact prongs, that is, prong 33, when the cover 22 is in its closed orientation, which brings the end portion 34 of the contact prong 33 into contact with the post 12 of the uppermost one of the batteries 11 within the cylindrical member 10.

It is to be noted that whenever the cover 22 is in its open orientation, the charger for batteries cannot be inserted into a wall outlet or the like because the two contact prongs 32 and 33 would not be properly aligned.

When the cover 22 is in its open orientation (FIG. 1), the spring 49 mechanically biases the slidable member 42 radially inward with respect to the axis of the cylindrical member 10 and beyond its lip as shown in FIG. 1, thereby retaining the batteries 11 therein in the absence of a user intentionally exerting force on the slidable member 44 to move it away from the lip so that batteries can be inserted into or removed from the cylindrical member 10. When the cover 22 is in its closed orientation (FIG. 2), the spring 49 biases the slidably member radially inward with respect to the cylindrical member 10 and over a peripheral portion of the cover 22 thereby retaining the cover closed and assuring that the contact prongs 32 and 33 are aligned so that they may be inserted into a conventional A.C. wall receptacle or the like.

Figure 10:
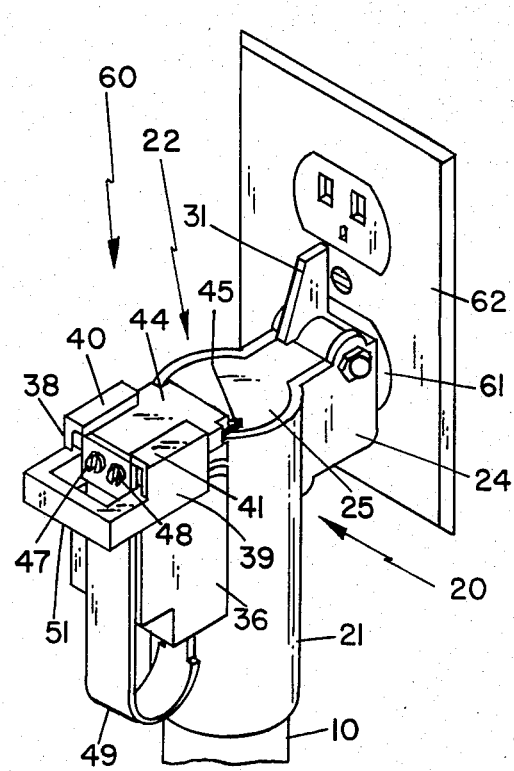
FIG. 10 is a pictorial view of a charger for batteries constructed in accordance with the present invention illustrated as being directly supported by a conventional A.C. wall receptacle.

Turning briefly to FIG. 10, a charger for batteries constructed in accordance with the present invention is generally designated by the numeral 60 and illustrated as being supported by a conventional A.C. wall receptacle 61 which is accessible through an aperture in a conventional cover plate 62, a second A.C. receptacle being present, as is conventional.

The shaped member 21 of the charger 60 for batteries is positioned with its contact prongs (not visible) inserted into the receptacle 61 so that the charger is supported thereby. The cylindrical member 10, as shown in FIG. 10, is relatively short, being sufficiently long to receive four D size cells or five C size cells and comply with the plug-in battery charger standards of Underwriters Laboratories, Inc., in particular the UL 1236 standards relating to maximum weight, movements and center of gravity (see UL 94, pg. 46F, Feb. 20, 1980). The other members of the charger 60, visible in FIG. 10, correspond to the members having the same numerals as the embodiment shown in FIGS. 1 and 2.

Figure 11:
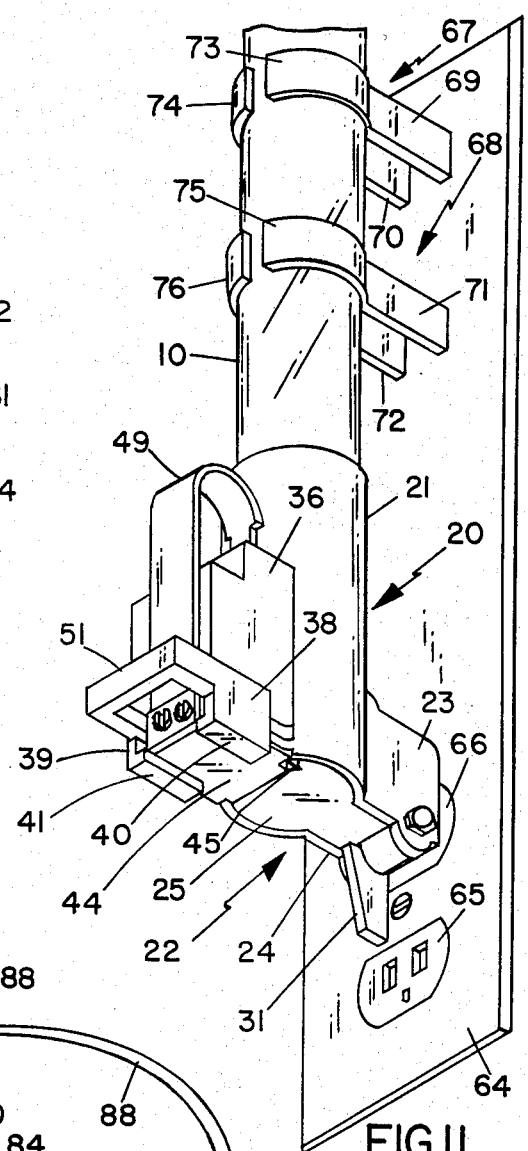
FIG. 11 is an illustration of a replacement cover plate for an A.C. wall outlet and which includes a support for supporting the charger of medium size and aligning it with the receptacle.

As shown in FIG. 11, a modified, replacement cover plate 64 is shown positioned over a pair of A.C. wall receptacles 65 and 66. The replacement cover plate 64 differs from a conventional cover plate in that it has a greater upward vertical extent and carries two vertically spaced-apart aligned pairs 67 and 68 of spring clamps. Each pair of the spring clamps is formed respectively of two opposed, resilient members 69, 70 and 71, 72 which have respective arcuate end portions 73, 74 and 75,76 fixed to horizontally extending integrated supports of spring clamps which are fixed to the plate 64. The pairs 67 and 68 of spring clamps can be formed integrally with the plate 64 proper or be separate components fixed to the plate using conventional techniques. It is also possible to fix the pairs 67 and 68 of spring clamps to the wall rather than to a modified cover plate.

A charger for batteries made in accordance with the present invention, having a cylindrical mamber 10 for holding the batteries can be positioned so that its cylindrical member is held and supported by the pairs of spring clamps 67 and 68 which also align the contact prongs so that they can be easily inserted into the receptacle 66. It is believed that the battery-containing cylindrical member 10 of a charger which may be supported by the pairs 67 and 68 of spring clamps can be considerably longer than the cylindrical member 10 shown in FIG. 10. As in the case of FIG. 10, the other members of the charger shown in FIG. 11 and not discussed in detail at this point, correspond to those members having the same reference numerals as the embodiment shown in FIGS. 1 and 2. Since these members serve substantially identical functions and have substantially identical structure, a detailed discussion is not necessary.

Figure 12:
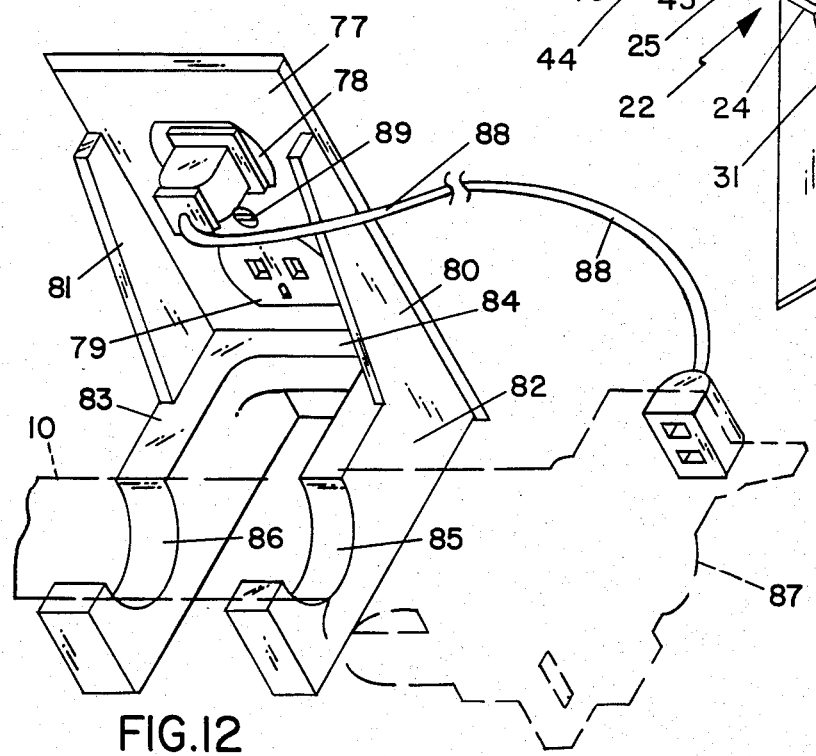
FIG. 12 is an illustration of a replacement cover plate for an A.C. wall outlet which includes supports for a charger for batteries, shown in phantom, constructed in accordance with the present invention, the charger being connected to the A.C. outlet via an extension cord.

A second illustrative modified replacement cover plate 77 is illustrated in FIG. 12, a charger, shown phantom, for batteries constructed in accordance with the present invention being positioned on a support arrangement formed on the replacement cover plate. The support arrangement is developed as an integral portion of a replacement cover plate 77 which is to be positioned over a pair of A.C. wall receptacles 78, 79 which, like the embodiments illustrated in FIGS. 10 and 11, are provided in a conventional recessed A.C. junction box. The replacement cover plate 77 is held by a threaded bolt 89 to the junction box and is positioned over the A.C. receptacles 78, 79 so that the apertures in the replacement cover plate 77 expose and provide access to the receptacles. As thus far described, the replacement cover plate 77 is of conventional construction and similar to a conventional cover plate.

The illustrated replacement cover plate 77 differs from a conventional cover plate by having, extending along adjacent respected side edges thereof and integral with the cover plate 77 proper, a pair of struts 80, 81 which support a pair of spaced-apart supporting members 82, 83 formed integrally therewith. The supporting members project forward from the major exposed surface of the cover plate 77. The supporting member 82, 83 are joined together by a strenghtening rib 84 which is also integral with the cover plate 77 and extends between the supporting members 82 and 83. A pair of circular arcuate grooves 85, 86 are formed on the distal portion of the respective upper surfaces of the respective supporting members 82, 83, each having an arcuate extent somewhat greater than 180°. A charger 87 for batteries constructed in accordance with the present invention and illustrated in phantom, can be removably positioned so as to be supported by the supporting members 82, 83 on the arcuate surfaces of the grooves 85, 86, after its cylindrical member 10 is inserted into these arcuate grooves.

The ends of the supporting members 82, 83 adjacent to the grooves 85, 86 are somewhat resilient, allowing a user, using gentle pressure, to snap the cylindrical battery-containing member 10 into the grooves 85, 86 and thereby removeably position the charger in the vicinity of an A.C. receptacle. In this case, the pair of contact prongs (not visible in FIG. 12) are not inserted into the A.C. receptacle, but instead is connected thereto via a conventional extension cord 88.

The cylindrical member 10, as shown in FIGS. 11 and 12, can contain a considerable number of batteries, even more than twenty-five, for example. It is also to be understood that surface-engaging supports could be associated with or fixed to the charger for batteries so that it could be directly supported on a table top floor or the like, a conventional extension cord being used in these cases to connect the charger to an A.C. wall receptacle or the like.

It is to be appreciated that any number of batteries, from one to a maximum possible can be placed in the individual tubular cylindrical member 10 in any of the illustrated embodiments, which can be designed in several different lengths because the charging circuit is to be a current, rather than a voltage, regulated source. The charging source is, as stated above, preferably a current pulse producing source.

Another important feature is that the end 34 of the contact prong 33 is recessed within the bore 29 so that were the batteries 11 incorrectly inserted so that the posts 12 (as shown in FIG. 1) were downwardly directed, the outer casing of the uppermost one of the batteries 11 would not contact the end portion 34 of the prong 33 thereby preventing completion of the circuit.

It is to be understood that the foregoing detailed description, when taken in conjunction with the accompanying drawings relate to exemplary embodiments of a charger for batteries in accordance with the present invention which has been set out by way of example, not by way of limitation. It is to be appreciated that numerous other embodiments and variants are possible without departing from the spirit and scope of the present invention, its scope being defined by the appended claims.

What is claimed is:

1. In a charger for batteries, the combination of a housing including a hollow member having an open end through which batteries to be charged are to be inserted end-to-end, constant-tension spring means within said housing for urging the batteries outwardly of said housing via said open end, a movable cover positioned adjacent to said open end of said hollow member, means for movably supporting said cover on said housing, a pair of spaced-apart contact prongs, at least one of which is carried by said movable cover, thereby preventing electrical connection to said prongs wherever said cover is moved away from said open end of said hollow member, latching means for retaining said cover in a closed orientation, and retaining means cooperating with said latching means for retaining the batteries in said tubular member whenever said cover is moved away from said open end of said tubular member.

2. In a charger for batteries, the combination of a housing having an open portion through which batteries to be charged are to be inserted, spring means within said housing for urging the batteries outwardly of said housing, a pivotable cover for said open portion of said housing, means for pivotably supporting said cover on said housing, respective electrical contact means on said housing, at least one of said contact means being carried by said pivotable cover, thereby preventing electrical connection to said contact means whenever said cover is pivoted away from said open portion of said housing, spring-loaded latching means for retaining said cover in a closed orientation, and means on said latching means for retaining the batteries in said housing whenever said cover is pivoted away from said open portion of said housing.

3. In a charger for batteries, the combination of a housing including a hollow member having an open end through which batteries to be charged are to be inserted end-to-end, constant-tension conductive spring means within said housing for engaging an end terminal of an innermost battery and provide an electrical contact thereto while urging the batteries outwardly of said housing via said open end, cover means positioned adjacent to said open end of said hollow member, means for movably supporting said cover means on said housing, a pair of spaced-apart contact prongs on said housing, at least one of which is carried by said cover means, thereby preventing electrical connection to said prongs whenever said cover means is moved away from said open end of said hollow member, and solid-state charging means within said housing and connected to one of said contact prongs, said contact-tension spring means being electrically coupled to said solid-state charging means.

4. In a charger for batteries, the combination of a housing having an open portion through which batteries to be charged are to be inserted, cover means positioned adjacent to said open portion of said housing, means for movably supporting said cover means on said housing, a pair of spaced-apart contact prongs on said housing, at least one of which is carried by said cover means, thereby preventing electrical connection to said prongs whenever said cover means is moved away from said open portion of said housing, and solid-state charging means within said housing and connected to the other one of said contact prongs, said charging means comprising an integrated circuit disposed against said other contact prong, thereby utilizing said other contact prong as at least a portion of a heat sink.

5. A charger for batteries comprising a housing including a hollow member having an open end through which batteries to be charged are to be inserted, constant-tension spring means within said hollow member for urging the batteries outwardly of said housing, a cover positioned adjacent to said open end of the hollow member, means for movably supporting said cover on the said housing, and a pair of spaced-apart contact prongs, at least one of which is carried by said movable cover, thereby preventing electrical connection to said prongs whenever said cover is moved away from said open end of the hollow member, latching means for retaining the cover in its closed position, and retaining means cooperating with said latching means for retaining the batteries in said tubular member whenever said cover is moved away from said open end of said housing.

6. A charger for batteries comprising a housing having an open portion through which batteries to be charged are to be inserted, spring means within said housing for urging the batteries outwardly of said housing, a cover positioned adjacent to said open portion of the housing, means for movably supporting said cover on the said housing, a pair of spaced-apart contact prongs, at least one of which is carried by said movable cover, thereby preventing electrical connection to said prongs whenever said cover is moved away from said open portion of the housing, and latching means for retaining the cover in its closed position, and wherein said housing includes a tubular member closed at one end, said open portion being defined by its open other end.

7. A charger for batteries comprising a housing including a hollow member having an open end through which batteries to be charged are to be inserted, electrically conductive, constant-tension spring means within said hollow member for urging the batteries outwardly of said housing, a cover positioned adjacent to said open end of said hollow member, means for pivotably supporting said cover on said housing adjacent to said open end, respective electrical contact means on said housing, at least one of said contact means being carried by said pivotable cover, thereby preventing electrical connection to said contact means whenever said cover is pivoted away from said open end of said hollow member, and D. C. current pulse producing means within said housing, said conductive, constant-tension spring means being conductively coupled to said D. C. current pulse producing means.

8. A charger for batteries according to claim 7, including spring-loaded latching means for retaining said cover in a closed orientation.

9. A charger for batteries comprising a housing having an open portion through which batteries to be charged are to be inserted, spring means within said housing for urging the batteries outwardly of said housing, a cover positioned adjacent to said open portion of said housing, means for pivotably supporting said cover on said housing, respective electrical contact means on said housing, at least one of said contact means being carried by said pivotable cover, thereby preventing electrical connection to said contact means whenever said cover is pivoted away from said open portion of said housing, spring-loaded latching means for retaining said cover in a closed orientation, and means on said latching means for retaining the batteries in said housing whenever said cover is pivoted away from said open portion of said housing.

10. A charger for batteries according to claim 7, including means for retaining the batteries in said housing whenever said cover is pivoted away from said open portion of said housing.

11. A charger for batteries comprising a housing having an open portion through which batteries to be charged are to be inserted, spring means within said housing for urging the batteries outwardly of said housing, a cover positioned adjacent to said open portion of said housing, means for pivotably supporting said cover on said housing, and respective electrical contact means on said housing, at least one of said contact means being carried by said pivotable cover, thereby preventing electrical connection to said contact means whenever said cover is pivoted away from said open portion of said housing, and wherein said housing includes a tubular member closed at one end, said open portion being defined by its open other end.

12. A charger for batteries comprising a housing including a hollow member having an open end through which batteries to be charged are to be inserted, constant-tension conductive spring means within said housing for engaging an end terminal of an innermost battery and for urging the batteries outwardly from said housing via said open end, movable cover means positioned adjacent to said open end of said hollow member, means for movably supporting said cover means on said housing, a pair of spaced-apart contact prongs on said housing, at least one of which is carried by said cover means, thereby preventing electrical connection to said prongs whenever said cover means is moved away from said open end of said hollow member, and D. C. current pulse producing means within said housing, said constant-tension conductive spring means being conductively coupled to said pulse producing means.

13. A charger for batteries according to claim 12, including solid-state charging means within said housing and connected to the other one of said contact prongs.

14. A charger for batteries comprising a housing having an open portion through which batteries to be charged are to be inserted, constant-tension conductive spring means within said housing for engaging an end terminal of an innermost battery, movable cover means positioned adjacent to said open portion of said housing, means for movably supporting said cover means on said housing, a pair of spaced-apart contact prongs on said housing, at least one of which is carried by said cover means, thereby preventing electrical connection to said prongs whenever said cover means is moved away from said open portion of said housing, and solid-state charging means within said housing and connected to the other one of said contact prongs, and wherein said housing includes a tubular member closed at one end, said open portion being defined by its open other end.

15. A charger for batteries comprising a housing having an open portion through which batteries to be charged are to be inserted, cover means positioned adjacent to said open portion of said housing, means for movably supporting said cover means on said housing, a pair of spaced-apart contact prongs on said housing, at least one of which is carried by said movable cover, thereby preventing electrical connection to the prongs whenever said cover means is moved away from said open portion of said housing, and solid-state charging means within the housing and connected to the other one of said contact prongs, said charging means comprising an integrated circuit disposed against said other contact prong, thereby utilizing said other contact prong as at least a portion of a heat sink.

16. A charger for batteries comprising a housing having an open portion through which batteries to be charged are to be inserted, cover means positioned adjacent to said open portion of said housing, means for movably supporting said cover means on said housing, a pair of spaced-apart contact prongs on said housing, at least one of which is carried by said movable cover, thereby preventing electrical connection to the prongs whenever said cover means is moved away from said open portion of said housing, and wherein said housing includes a tubular member closed at one end, said open portion being defined by its open other end.

17. A charger for batteries comprising a housing having an open portion through which batteries to be charged are to be inserted, biasing means within said housing for urging the batteries outwardly of said housing, a cover positioned adjacent to said open portion of said housing, means for movably supporting said cover on the said housing, a pair of spaced-apart contact prongs, at least one of which is carried by said cover, thereby preventing electrical connection to said prongs whenever said cover is moved away from said open portion of said housing, latching means for retaining said cover in a closed orientation, means on said latching means for retaining the batteries in said housing whenever said cover is in an open orientation with respect to said open portion of said housing, and charging means within said housing and electrically connected to one of said prongs.

18. A charger for batteries according to claim 17, wherein said charging means comprises an integrated circuit and is disposed against the other prong of said contact prongs, thereby utilizing said other contact prong as at least a portion of a heat sink.

19. A charger for batteries according to claim 17, wherein said housing includes a tubular member closed at one end, said open portion being defined by its open other end.

20. A charger for batteries comprising a housing having an open portion through which batteries to be charged are to be inserted, cover means positioned adjacent to said open portion of said housing, means for movably supporting said cover means for movement between a first orientation in which said cover means closes said open portion of said housing and an orientation in which said cover means is positioned away from said open portion of said housing to allow batteries to be inserted and removed, means for connecting the charger to an A.C. power source, and means responsive to positioning of said cover means for preventing said means for connecting the charger to an A.C. source from functioning unless said cover means is in the first orientation, latching means for retaining said cover means in the first orientation, and means for retaining batteries in said housing whenever said cover means is other than in the first orientation, and wherein said means for retaining batteries in said housing is carried by said latching means.

21. A charger for batteries comprising a housing having an open portion through which batteries to be charged are to be inserted, cover means positioned adjacent to said open portion of said housing, means for movably supporting said cover means for movement between a first orientation in which said cover means closes said open portion of said housing and an orientation in which said cover means is positioned away from said open portion of said housing to allow batteries to be inserted and removed, means for connecting the charger to an A.C. power source, and means responsive to positioning of said cover means for preventing said means for connecting the charger to an A.C. source from functioning unless said cover means is in the first orientation, and wherein said housing comprises a tube within which batteries may be placed end-to-end in electrical series connection.

22. A charger for batteries according to claim 21, including circuit means for producing D.C. charging current to the batteries.

23. A charger for batteries according to claim 22, wherein said circuit means comprises a current regulated circuit means for producing D.C. current pulses as charging current to the batteries.

24. A charger for batteries according to claim 22, wherein said circuit means comprises integrated D.C. current pulse producing circuit means for supplying charging current to the batteries.

25. A charger for batteries according to claim 25, including circuit means for producing D.C. charging current to the batteries.

26. A charger for batteries according to claim 25, wherein said circuit means comprises current regulated circuit means for producing D.C. current pulses as charging current to the batteries.

27. A charger for batteries according to claim 25, wherein said circuit means comprises integrated D.C. current pulse producing circuit means for supplying charging current to the batteries.

28. A charger for batteries comprising a housing having an open portion through which batteries to be charged are to be inserted, cover means positioned adjacent to said open portion of said housing, means for movably supporting said cover means for movement between a first orientation in which said cover means closes said open portion of said housing and an orientation in which said cover means is positioned away from said open portion of said housing to allow batteries to be inserted and removed, means for connecting the charger to an A.C. power source, and means responsive to positioning of said cover means for preventing said means for connecting the charger to an A.C. source from functioning unless said cover means is in the first orientation, and wherein said housing includes a tubular member closed at one end, said open portion being defined by its other open end.

29. A charger for batteries according to claim 28, including latching means for retaining said cover means in the first orientation.

30. A charger for batteries according to claim 29, including means for retaining batteries in said housing whenever said cover means is other than in the first orientation.

31. A charger for batteries according to claim 30, wherein said means for retaining batteries in said housing is carried by said latching means.

32. A charger for batteries according to claim 28, including means for retaining batteries in said housing whenever said cover means is other than in the first orientation.

33. A charger for batteries according to claim 28, wherein said tubular member comprises a tube within which batteries may be placed end-to-end in electrical series connection.

34. A charger for batteries according to claim 33, including circuit means for producing D.C. charging current to the batteries.

35. A charger for batteries according to claim 34, wherein said circuit means comprises a current regulated circuit means for producing D.C. current pulses are charging current to the batteries.

36. A charger for batteries according to claim 34, wherein said circuit means comprises integrated D.C. current pulse producing circuit means for supplying charging current to the batteries.

37. A charger for batteries according to claim 28, including circuit means for producing D.C. charging current to the batteries.

38. A charger for batteries according to claim 37, wherein said circuit means comprises current regulated circuit means for producing D.C. current pulses as charging current to the batteries.

39. A charger for batteries according to claim 37, wherein said circuit means comprises integrated D.C. current pulse producing circuit means for supplying charging current to the batteries.

40. A charger for batteries according to claim 28, including means for preventing completion of electrical charging circuit to batteries whenever an end battery is positioned so that it is poled incorrectly.

* * * * *